(12) United States Patent
Rolph et al.

(10) Patent No.: US 7,097,210 B2
(45) Date of Patent: Aug. 29, 2006

(54) METHOD AND APPARATUS FOR PROVIDING A TRANSITION CONNECTOR TO INTRODUCE OUTSIDE AIR AND VENT FLUE FOR BOILER COMBUSTION

(75) Inventors: Neil Rolph, LaPorte, IN (US); Shuqing Cui, Valparaiso, IN (US)

(73) Assignee: SPX Corporation, Charlotte, NC (US)

( * ) Notice: Subject to any disclaimer, the term of this patent is extended or adjusted under 35 U.S.C. 154(b) by 278 days.

(21) Appl. No.: 10/673,461

(22) Filed: Sep. 30, 2003

(65) Prior Publication Data

US 2006/0028018 A1    Feb. 9, 2006

(51) Int. Cl.
F16L 55/00 (2006.01)
F16L 49/00 (2006.01)

(52) U.S. Cl. .................. 285/148.13; 285/252; 285/337

(58) Field of Classification Search ................ 285/252, 285/253, 337, 148.13
See application file for complete search history.

(56) References Cited

U.S. PATENT DOCUMENTS

| | | | |
|---|---|---|---|
| 1,713,685 A | 5/1929 | Austin | |
| 2,776,151 A * | 1/1957 | Harkenrider | 285/148.13 |
| 2,880,722 A * | 4/1959 | Dickinson, Jr. | 285/242 |
| 3,091,223 A | 5/1963 | Vitale | |
| 3,533,649 A * | 10/1970 | Williams | 285/148.13 |
| 3,578,362 A * | 5/1971 | Cauthery | 285/110 |
| 3,612,584 A * | 10/1971 | Taylor | 285/148.13 |
| 3,659,560 A | 5/1972 | Carter | 122/494 |
| 3,666,918 A | 5/1972 | Clark et al. | |
| 3,718,154 A | 2/1973 | Doumany | 137/360 |
| 3,831,624 A | 8/1974 | Doumany | 137/360 |
| 3,858,914 A * | 1/1975 | Kerie et al | 285/238 |
| 3,859,505 A | 1/1975 | Herbrand et al. | 219/433 |
| 3,915,480 A * | 10/1975 | Kish et al | 285/148.13 |
| 4,338,888 A | 7/1982 | Gerstmann et al. | |
| 4,482,170 A * | 11/1984 | Jacobson et al. | 285/55 |
| 4,502,626 A | 3/1985 | Gerstmann et al. | |
| 4,577,681 A | 3/1986 | Hughes | 165/109.1 |
| 4,610,471 A * | 9/1986 | Halen et al. | 285/337 |
| 4,909,190 A | 3/1990 | Finch | 122/1 A |
| 4,940,042 A | 7/1990 | Moore, Jr. et al. | 126/344 |
| 5,062,354 A | 11/1991 | Goins et al. | |
| 5,186,661 A | 2/1993 | Capper | 439/718 |
| 5,372,185 A | 12/1994 | Lannes | 165/70 |
| 5,449,205 A * | 9/1995 | Silletti et al. | 285/148.13 |
| 5,463,935 A | 11/1995 | Zanarini | 99/292 |
| 5,660,165 A | 8/1997 | Lannes | 126/641 |
| 5,761,379 A | 6/1998 | Lannes | |
| 5,829,793 A * | 11/1998 | Svetlik | 285/148.13 |
| 5,951,825 A | 9/1999 | Land | 202/83 |
| 5,954,265 A | 9/1999 | Hall et al. | 236/94 |
| 6,371,154 B1 * | 4/2002 | Kesterman et al. | 137/315.01 |
| 6,415,744 B1 | 7/2002 | Choi | 122/18.1 |
| 6,470,836 B1 | 10/2002 | Manley et al. | 122/40 |

(Continued)

OTHER PUBLICATIONS

Brochure, "Wall hung, fully condensing, combination boiler", Remeha w21c/w28c ECO.

(Continued)

Primary Examiner—Vishal Patel
(74) Attorney, Agent, or Firm—Baker & Hostetler LLP

(57) ABSTRACT

A method and apparatus for sealing a combustion intake for a boiler from inside air is provided. A method and apparatus for providing a transition piece for venting fresh air to and combusted gas away from a boiler is also provided. A method of connecting a transition piece to PVC, ABS OR CPVC ductwork is also provided.

27 Claims, 9 Drawing Sheets

U.S. PATENT DOCUMENTS

| | | | |
|---|---|---|---|
| 6,574,426 B1 | 6/2003 | Blanco, Jr. | 392/485 |
| 6,604,491 B1 | 8/2003 | Davis | |
| 6,772,713 B1 * | 8/2004 | Rolph et al. | 122/19.1 |
| 2002/0074350 A1 | 6/2002 | Jones et al | 225/146.5 |
| 2002/0089236 A1 | 7/2002 | Cline et al. | 307/149 |

OTHER PUBLICATIONS

Manual, "Installing, Operating & Maintaining Munchkin High Efficiency Heater", Model 199, Cover of Manual, Table of Contents, Components Diagram, copy of Warranty and pp. 1-15.

* cited by examiner

METHOD AND APPARATUS FOR PROVIDING A TRANSITION CONNECTOR TO INTRODUCE OUTSIDE AIR AND VENT FLUE FOR BOILER COMBUSTION

CLAIM OF PRIORITY

This application claims priority to the non-provisional U.S. patent application entitled, Method and Apparatus for Providing and Utilizing Outside air for Boiler Combustion, having Ser. No. 10/317,197, and filed Dec. 12, 2002, the disclosure of which is hereby incorporated by reference in its entirety.

FIELD OF THE INVENTION

The present invention relates generally to a method and apparatus for providing outside air for combustion in a boiler. More particularly, the present invention relates to a method and apparatus for sealing a boiler's combustion air intake from inside air and venting combusted air to the outside.

BACKGROUND OF THE INVENTION

Domestic boilers are used to generate hot water, which may be used to flow through a circuit to provide heating to a facility such as a home or office building. The hot water also may be stored in a hot water tank and used for hot water needs such as running a dishwasher, showers and other domestic hot water uses. Often domestic boilers are located in homes in non-living spaces. For example, they may be located in a utility closet, a basement, a garage, or in other parts of the home that is more associated with storage or utility than with a living space. When boilers are placed in storage or utility areas they are typically mounted on the floor.

Sometimes, for a variety of reasons such as limited storage or utility space, boilers may be located in living spaces within homes or apartments. In order to conserve space, the boiler may be mounted on a wall. There are several desirable features associated with a wall-mounted boiler, such as a small size and/or weight to facilitate the wall mounting. In addition, wall mounted boilers are often located in kitchens or other living spaces, and therefore it is desired that they have an attractive appearance. Most known domestic boilers are configured to be one or the other of a wall mounted boiler, or a floor mounted boiler. This provides a disadvantage in that it is not possible to use a single boiler type for the different applications of wall mounting versus floor mounting. Thus, there is a need for a boiler which is adaptable to a multi-position mounting whether it be wall or floor mounted.

As with any energy-consuming device, increased efficiency is always a goal. Some known boilers have reduced efficiency for a variety of reasons. For example, sometimes room air is used in the combustion chamber and burned and vented to the outside. This results in a loss of efficiency in that the room air which was used for combustion and then vented to the outside may have been first processed by a heating, ventilation, or air conditioning system. A more efficient use of energy would involve the use of bringing in unprocessed outside air for combustion and then venting the combusted outside air back to the outside, thus maintaining room air which has been conditioned within the home. Thus, it is desirable to provide a boiler that burns almost exclusively outside air rather than using room air for combustion.

Another factor which limits known boilers is that many heat exchangers used in boilers are cast iron. Many boilers limit the amount of cooling of the combustion gases because if the combusted gases are cooled too much, the water vapor present in the combustion gases (a byproduct of combustion) will condense and form a condensate which may corrode the cast iron heat exchanger. Thus, using a cast iron heat exchanger limits boiler efficiency because combustion gases must be limited in how much they can be cooled. Limiting the amount of heat harvested from combustion gases limits efficiency because heat is wasted when it is vented out with exhaust gases.

Another limitation of many boilers equipped with cast iron heat exchangers is that some of them use parallel flow configuration. This limitation is related to the restraint of the cooling of the exhaust gases as mentioned above. Parallel flow heat exchangers are a less efficient type of heat exchanger than a counter flow heat exchanger. Counter flow heat exchangers are often not used because they are so efficient that they cool exhaust gases to a temperature that is not acceptable. If counter flow designs are used in cast iron heat exchangers they may need to be controlled in order to maintain the exhaust gases within an exceptable range of temperature to a degree where they may loose efficiency and thus nearly lose the efficiency benefits of being a counter flow heat exchanger. Thus, there is a need for a boiler that is not limited to cooling exhaust gases to a temperature that maintain water vapor in vapor form.

Accordingly, it is desirable to provide a boiler which has an increased efficiency and is not limited to cooling exhaust gases to the temperature ranges that maintain water vapor in vapor form. It is also desirable to provide a boiler that is not limited to the use of parallel flow heat exchangers but can incorporate a counter flow heat exchanging design.

If a boiler is not limited in its cooling of exhaust gases, it will generate condensate as water vapor in the exhaust gases condenses. Accordingly, it is desirable to provide a boiler that can accommodate condensate forming in the boiler and/or can accommodate the corrosive effects of the condensate.

Efficiency may further be increased by pre-heating outside air before combusting it. Accordingly, it may also be desirable to preheat the outside air.

Another way in which efficiency may be lost in boilers is that the controller of the boiler is often in an on/off type control. When additional heating is required, the boiler turns on, when less heating is required the boiler turns off. This type of configuration of on/off control loses efficiency because turning the boiler on may create heating of hot water than is required. A boiler which may be controlled to increase and decrease output and be turned on and off is a more efficient design. In addition, a controller that monitors a variety of boiler conditions can make more accurate control manipulations to the boiler and thus increase its efficiency.

Accordingly, it is desirable to provide a boiler controller that monitors a variety of boiler conditions and controls the boiler to not just a on/off condition but rather on, off, increase or decrease boiler function.

Another desirable feature of nearly all manufactured goods, not just boilers, is to simplify the design. Simplified designs are more cost efficient in production and often require less maintenance than more complex designs. As previously mentioned, many known boilers use cast iron heat exchangers. These cast iron heat exchangers are often cast sections that are sealed and then bolted together. The multiple sections of the heat exchangers and the bolting together create complexity.

Accordingly, it is desirable to provide a heat exchanger without multiple sections, thus simplifying the heat exchanging design.

Simplifying a boiler design to permit more easy installation and maintenance of the boiler as also desirable. For example, location of the electrical connections in multiple places on the boiler complicates installation and maintenance of a boiler because service personnel have to hunt down electrical connections. Providing a boiler with easy connections to ducting and venting will also simplify boiler installation.

Accordingly, a boiler designed to simplify installation and maintenance is desired.

SUMMARY OF THE INVENTION

It is therefore a feature and advantage of the present invention to provide a boiler that is configured for installation in multiple positions such as a floor or wall mounting.

It is another feature and advantage of the present invention to provide a heat exchanger that uses primarily outside air for combustion, preheats the outside air, more fully harvests heat from exhaust gases, uses a counter flow heat exchanger and a controller that more accurately and efficiently controls the boiler.

It is another feature and advantage of the present invention to provide a boiler design including a mono block heat exchanger.

It is another feature and advantage of the present invention to provide a boiler that is simple to install and maintain.

The above and other features and advantages are achieved through the use of a novel method and apparatus as herein disclosed. In accordance with one embodiment of the present invention, a boiler is provided. The boiler includes a heat exchanger; a housing defining at least in part a chamber substantially sealed from ambient indoor air in the vicinity of the boiler; an air intake configured to provide air to the chamber for combustion in the heat exchanger; and an exhaust outlet configured to exhaust combustion gases from the heat exchanger to outside the boiler, wherein the heat exchanger is contained in the chamber and the exhaust outlet is at least partially contained in the chamber and the heat exchanger and exhaust outlet are spaced in the chamber to permit air within the chamber to circulate around the heat exchanger and at least part of the exhaust outlet.

In accordance with another embodiment of the present invention, a boiler is provided. The boiler includes means for exchanging heat; means for housing the heat exchanger defining at least in part a chamber substantially sealed from ambient air in the vicinity of the boiler; means for intaking air configured to provide air to the chamber for combustion in the heat exchanging means; and means for exhausting combustion gases from the heat exchanging means to outside the boiler, wherein the heat exchanging means is fully contained in the chamber and the exhausting means is at least partially contained in the chamber and the heat exchanging means and exhausting means are spaced in the chamber to permit air within the chamber to circulate around the heat exchanging means and at least part of the exhausting means outlet.

In accordance with another embodiment of the present invention, a method for increasing the efficiency of a boiler is provided. The method includes: substantially sealing a chamber from ambient indoor air; providing fluid communication between the chamber and outside air; drawing in air from the chamber to a heat exchanger for combustion; and preheating air in the chamber with heat emitted from the heat exchanger.

In accordance with another embodiment of the present invention, a transition piece is provided. The transition piece includes: a tube having a connecting end; a clamp attached to the tube near the connecting end; and a gasket mounted inside the tube near the connecting end, wherein the transition piece is configured to connect to a pipe by fitting the pipe inside the connecting end and engaging the gasket around an outside wall of the pipe in a substantially airtight manner and the clamp is configured to tighten an outside wall of the tube to create a pressfit engagement between the tube and the pipe.

In accordance with another embodiment of the present invention, a transition piece is provided. The transition piece includes: means for directing flow having a connecting end; means for clamping attached to flow directing means near the connecting end; and means for sealing mounted inside the flow directing means near the connecting end, wherein the transition piece is configured to connect to a duct by fitting the duct inside the connecting end and engaging the sealing means around an outside wall of the duct in a substantially airtight manner and the clamping means is configured to tighten an outside wall of the flow directing means to create a pressfit engagement between the flow directing means and the duct.

In accordance with another embodiment of the present invention, a method of connecting a transition piece to PVC, ABS or CPVC ductwork is provided. The method includes: inserting a PVC, ABS or CPVC pipe into a connecting end of the transition piece; seating the PVC, ABS or CPVC pipe against a gasket provided in the transition piece; and tightening a clamp provided on the transition piece to create a pressfit engagement between the PVC, ABS or CPVC pipe and the transition piece.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A preferred embodiment of the present invention includes a boiler for providing hot water for use in a heating circuit and/or domestic hot water needs such as providing hot water for showers, dishwashers and any other hot water need using additional secondary devices such as heat exchangers or indirectly fired water heaters.

Figure 1:
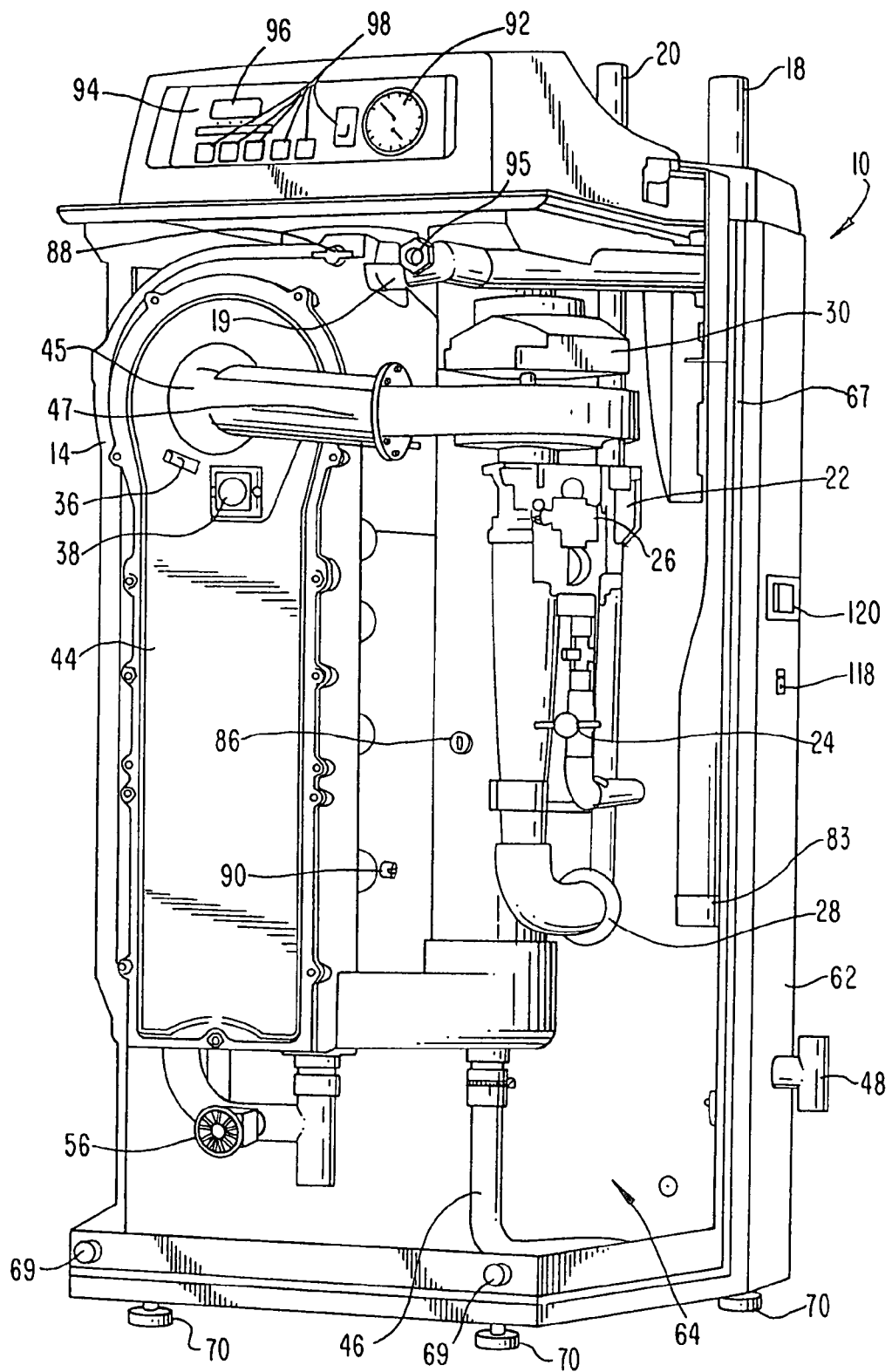
FIG. 1 is a perspective view of a preferred embodiment of the present invention, with the front access door removed exposing several internal components.
Figure 2:
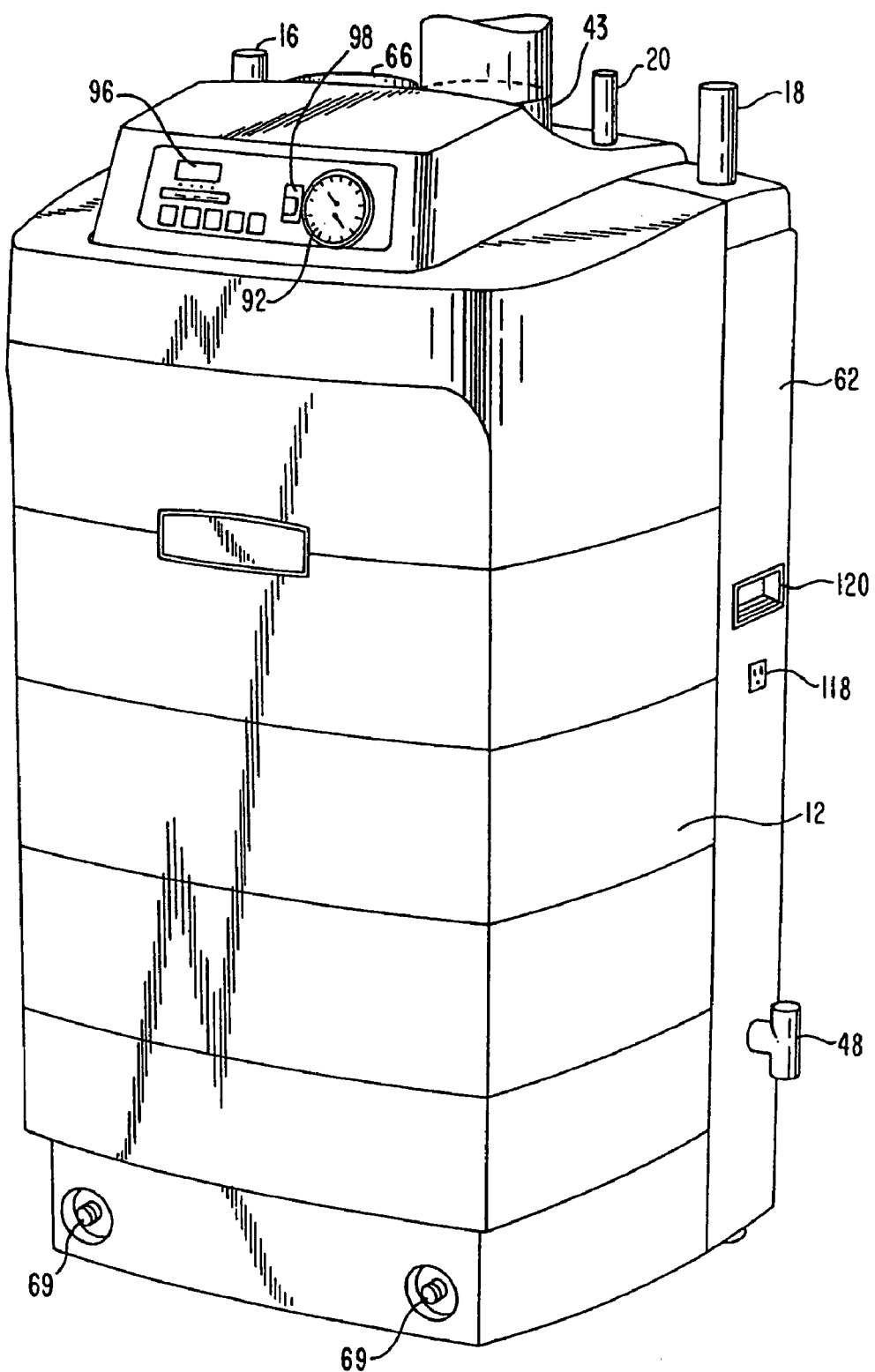
FIG. 2 is a perspective view illustrating a preferred embodiment of the present invention with the front access door in place.
Figure 6:
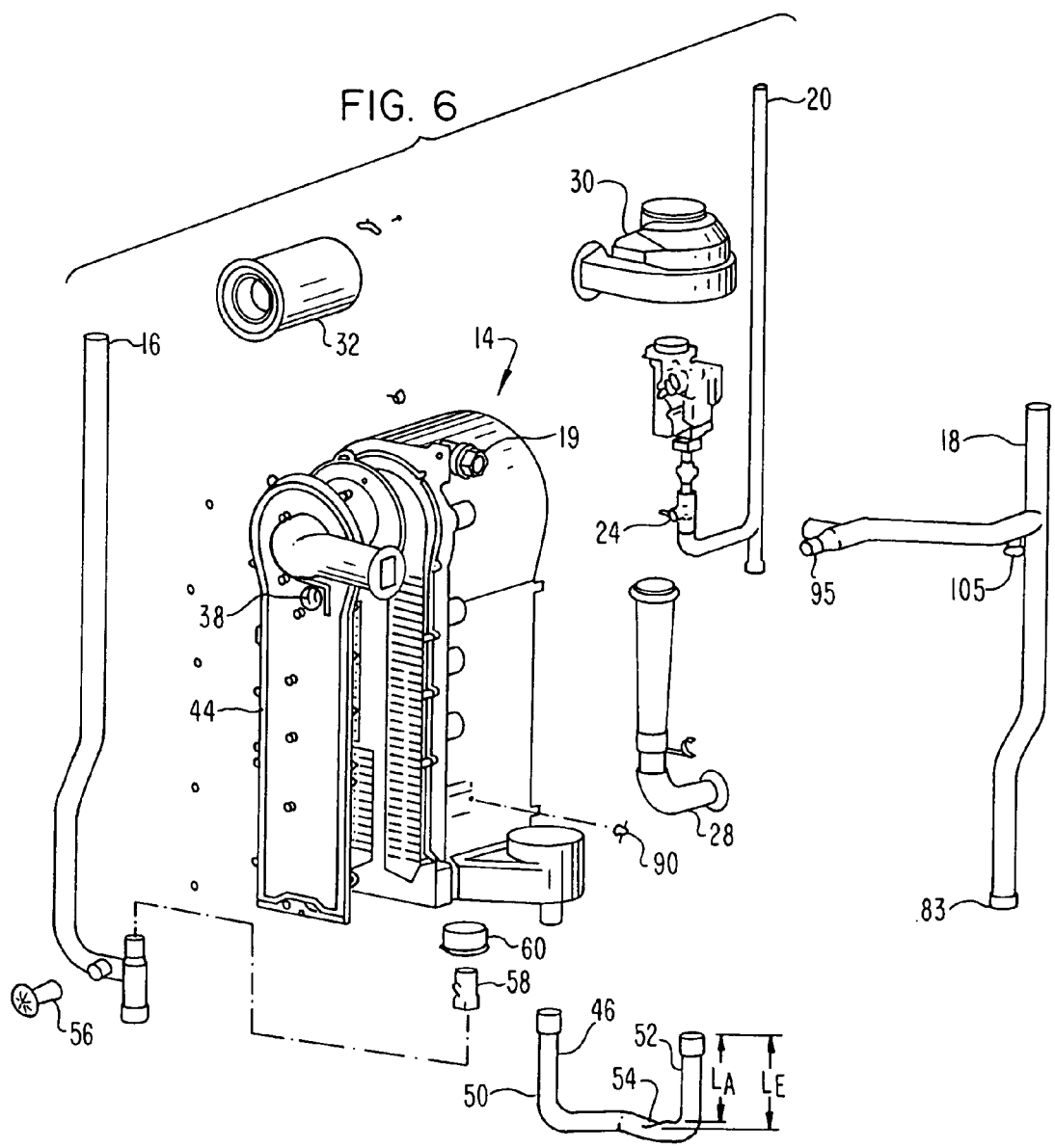
FIG. 6 is an exploded view of several internal components of a preferred embodiment of the present invention.

FIG. 1 illustrates an exemplary embodiment of the present invention including a boiler 10 with the front door 12 removed to show various internal components. The boiler 10, as shown in FIG. 1, is a gas-fired boiler. However, other embodiments of the present invention may include oil fired boilers or boilers heated by other sources. The boiler 10 includes a heat exchanger 14 and a water inlet pipe 16 shown in FIG. 2. Water is inlet via the inlet pipe 16 into the heat exchanger 14 where the water is heated and then expelled through a hot water outlet pipe 18 connected to the heat exchanger 14 at an outlet connection 19 as shown in FIG. 6. The hot water is typically used for either a heating circuit or used in domestic hot water uses. The hot water can also be stored in a hot water tank (not shown) using additional secondary devices such as heat exchangers or indirectly fired water heaters.

Figure 8:
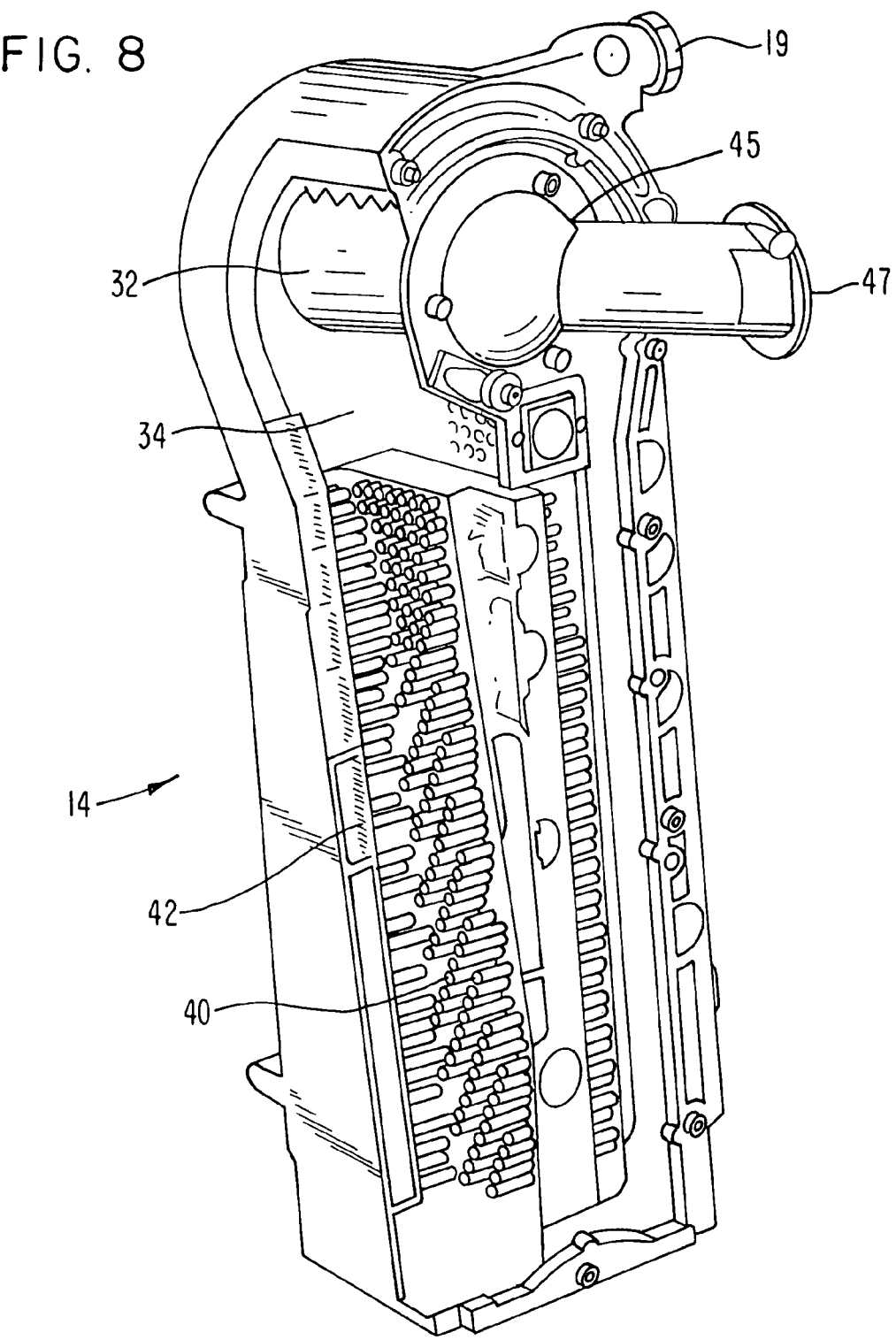
FIG. 8 is a partially cut away perspective view illustrating several internal elements of a heat exchanger used in a preferred embodiment of the present invention.

A fuel connection pipe 20 inlets fuel into the boiler 10. The fuel input to the boiler 10 through the fuel connection pipe 20 flows through a controlled valve 22, manual gas valve 24, and to a venturi 26 where it is mixed with air. Air is drawn into the venturi 26 by an air inlet 28. A blower 30 blows the fuel and air mixture into a burner 32, as shown in FIGS. 6 and 8. The air and fuel mixture is combusted on the burner 32 located in the combustion chamber 34, shown in FIG. 6. Returning to FIG. 1, an ignition electrode 36 initiates the combustion on the burner 32. A flame inspection window 38 permits a visual inspection of combustion.

Hot gases resulting from the combustion in the combustion chamber 34 are forced by the blower 30 to flow through heat transfer pins 40 where the heat is transferred from the combustion gases through the heat transfer pins 40 to the water circulating behind the pins 40 in the water circulation chambers 42. As the combustion gases flow through heat transfer pins 40 they are cooled and are eventually vented out of the flue pipe 43. An access cover 44 permits access to the combustion chamber 34 and the flow channel through the heat transfer pins 40. The access cover preferably includes a burner cover 45 and a fuel/air inlet 47.

Some embodiments of the present invention include a system for processing condensate. As previously mentioned, one of the byproducts of combustion is water vapor. If the combustion gases are cooled to a low enough level the water vapor will condense, thus forming a condensate that must be dealt with. Thus, in a preferred embodiment of the present invention a condensate trap 46 is provided. The condensate trap 46 is connected to a condensate drain 48, which may be connected to a drain system for disposing the condensate. Because the condensate drain 48 connection may be connected to a sewer system, the condensate trap 46 is configured in a U-shaped configuration in order to trap condensate in the U-portion of the condensate trap 46. Fluid contained within the U-shaped section of the condensate trap 46 prevents flue gases from the combustion process from flowing into living spaces, similar to the way a P-trap works in most sink and drain applications.

According to a preferred embodiment of the present invention, the condensate trap 46 contains an additional feature which permits it to be reduced in length and thus requiring less space to mount it within the boiler 10. As shown in FIG. 6, the condensate trap 46 has a high side 50 and a shorter side 52. The shorter side 52 has an effective length as long as the length of the high side 50 plus an additional effective length due to the reduced diameter portion 54, also referred to as a dimple 54 in the condensate trap 46. The reduced diameter portion or dimple 54 defines where the effective length starts for the low side 52. Rather than defining the length of the low side 52 as the distance between where the pipe bends to the top portion of the short side 52 ($L_A$ in FIG. 6) the effective length is measured from where the reduced diameter section or the lowest part of the dimple 54 to the top portion of the short side 52 (LE in FIG. 6). The dimple 54 provides an effective length ($L_E$) of approximately a half to a quarter inch longer than the actual length ($L_A$) of the short side of section 52. This feature reduces the space within the boiler 10 the condensate trap 46 requires.

To facilitate draining of the heat exchanger 14, a boiler drain valve 56 is provided on the water pipe 16. Fluid communication between the water pipe 16 and the heat exchanger 14 may be accomplished via a water supply compression fitting 58 and a return water bushing 60 as shown in FIG. 6.

Returning to FIG. 1, one of the advantages of the boiler 10 of the present invention is that the jacket or housing 62 and the front door 12 along with other components form a sealed chamber 64 which contains the air that is used for combustion. Outside air is drawn in through the air intake pipe 66 which is connected to a duct system configured to draw air in from the outside. This outside air is drawn in through the air intake 66 from a duct system into the chamber 64 defined by the jacket 62 and the front door 12. Air within the chamber 64 is drawn in through the air inlet 66 and as previously mentioned, mixed with fuel and flows through the blower 30 into the burner for combustion. Hot flue gases are in turn forced through the exchanger 14. As previously mentioned, this chamber 64 is substantially sealed from the room or environment in which the boiler 10 is placed. Some embodiments of the present invention seal the door 12 and the jacket 62 with a gasket 67. The front door 12 may attach to the boiler via knurled head screw fasteners 69 or other means for fastening commonly known in the art.

Providing a sealed chamber 64 for which a large portion of the boiler parts are located provides several advantages. First, the outside air brought into the sealed chamber 64 is preheated through heat escaping from the heat exchanger 14. Rather than losing this heat to outside of the boiler 10 to the room or the environment in which the boiler 10 is located, the heat is reclaimed in the preheating process. Preheating the combustion air provides an advantage of efficiency. Second, the sealed chamber 64 allows a substantially all of the air used in combustion to be drawn from the outside rather than using room air or air from the room in which the boiler 10 is located. Room air is often treated by being heated or cooled by a heating or cooling system. Using air conditioned or heated air for combustion and then venting it to the outside after combustion requires that the building heating or cooling system in which the boiler 10 is located must generate more treated air in order to keep the building at a proper temperature. Not using room air for combustion is efficient in that a building's heating or cooling system does not have to provide as much conditioned air.

Cooling the internal boiler components provides not only efficiency by preheating the air, but also eliminates the need for installing insulation within the boiler 10. Many known boilers include insulation, particularly near the heat exchanger 14, in order to prevent components of the boiler from melting or being damaged by heat. In particular, heat damage is a concern when the jacket 62 or front door 12 are made of plastic. Locating the heat exchanger 14 in the chamber 64 and providing enough outside air to cool the exterior of the heat exchanger 14 eliminates or at least reduces the need for insulation.

Figure 3:
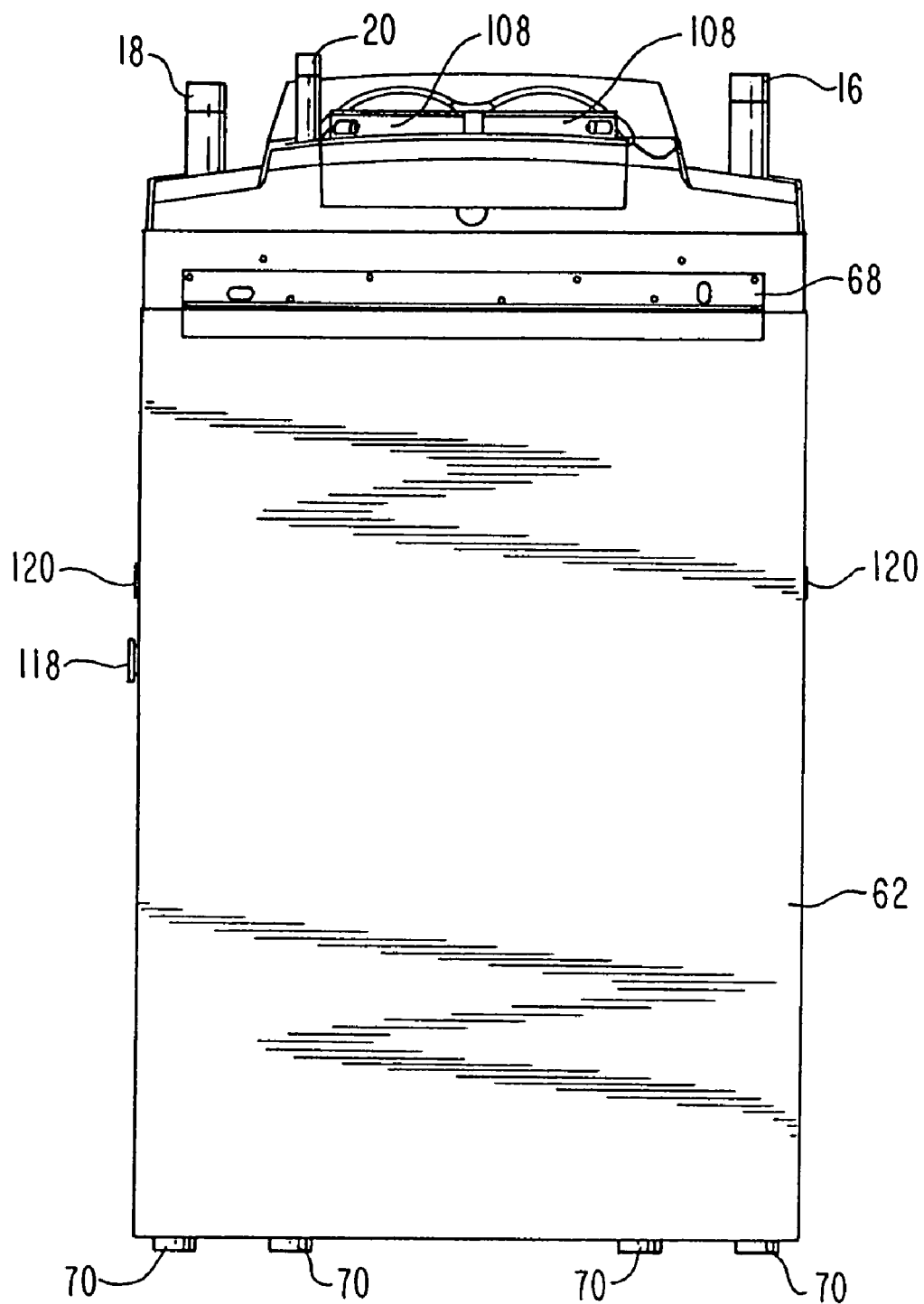
FIG. 3 is a rear view of a preferred embodiment of the present invention.
Figure 4:
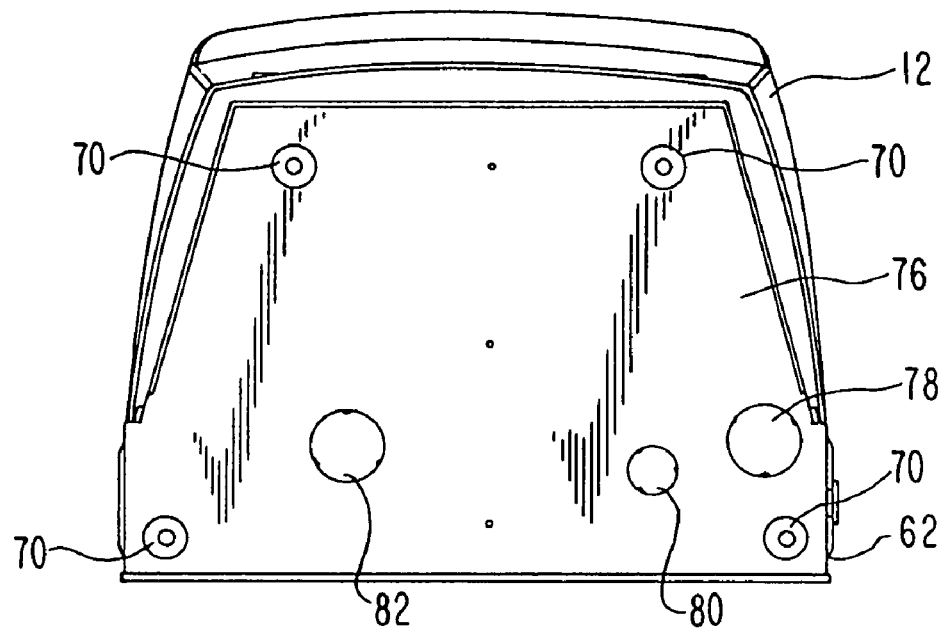
FIG. 4 is a bottom view of a preferred embodiment of the present invention.

Some embodiments of the present invention permit the boiler 10 to be floor or wall mounted. The boiler 10 shown in FIGS. 3 and 4 is configured to be either a wall mounted or a floor mounted boiler. A bracket 68 is provided on the back of the boiler 10 in order to provide a structure for mounting the boiler 10 to a wall, as seen in FIG. 3. If a floor mounted boiler 10 is desired, feet 70 are provided for mounting the boiler 10 to the floor.

Figure 7:
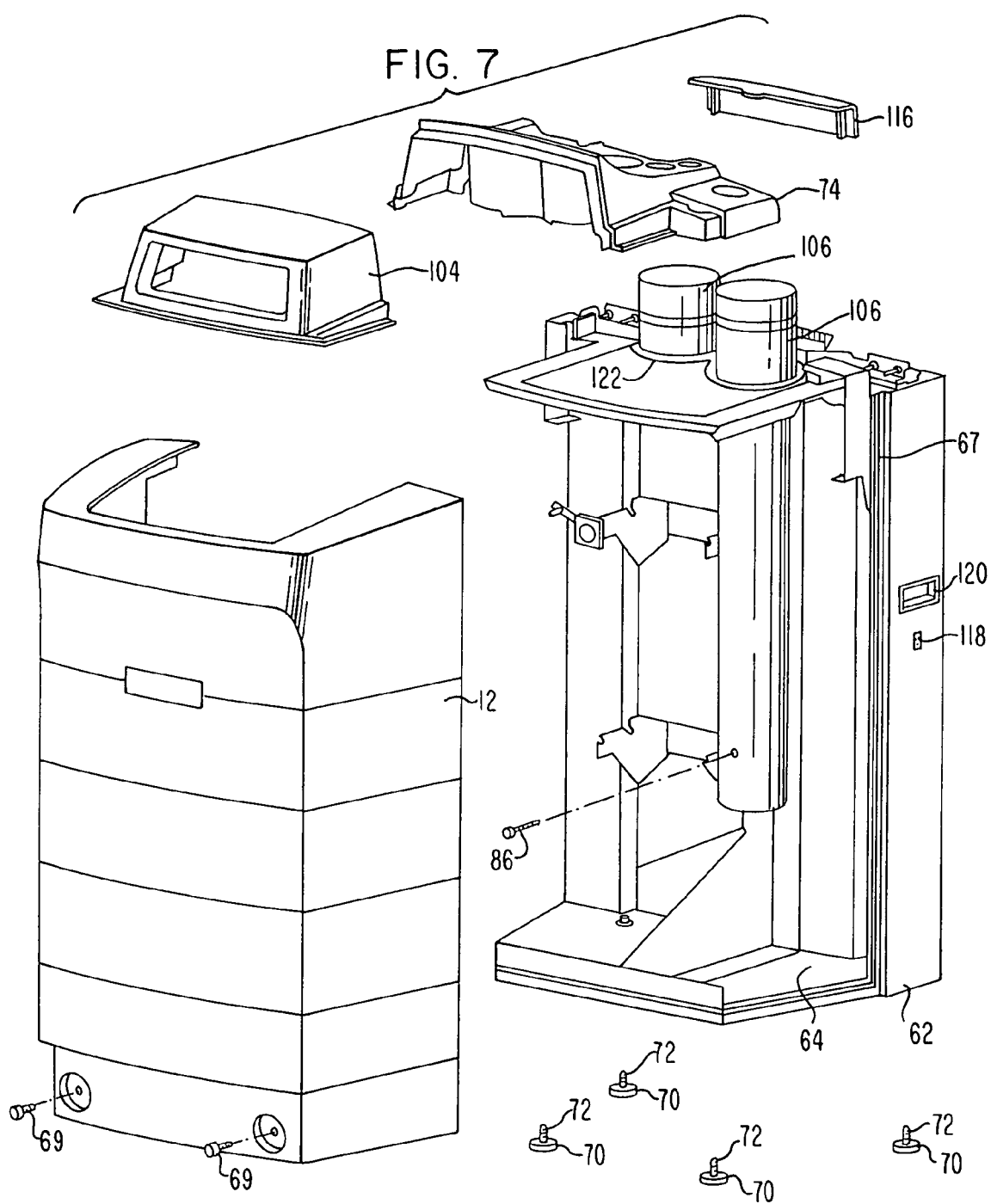
FIG. 7 is an exploded view of several outer components of a preferred embodiment of the present invention.

The feet 70 may be adjustable to permit the boiler 10 to be leveled or vary in height. In some embodiments, the feet 70 may be attached to the boiler 10 by threaded shafts 72 as shown in FIG. 7. Adjusting the height of each foot 70 is accomplished by twisting the foot 70.

In the United States, the majority of boilers sold are floor mounted boilers, therefore the pipes 16, 18 and 20 are preferably provided with the boiler 10 and mounted in the position to extend through a top portion 74 of the boiler 10. However, in certain wall mounted configurations it may be more desirable for these inlet, outlet, and fuel pipes 16, 18 and 20 to extend through a bottom portion 76 of the jacket 62 rather than a top portion 74. In order to accommodate a pipe down configuration, knock-outs 78, 80 and 82 are provided in a bottom portion 76 of the boiler 10 as illustrated in FIG. 4.

When installing the boiler 10 in a wall mounted configuration where the pipes 16, 18 and 20 are desired to extend through the bottom portion 76 of the boiler 10, the knock-outs 78, 80 and 82 are removed. The pipes 16, 18 and 20 are removed and reinstalled upside down to extend through the holes in the bottom portion of 76 of the boiler left behind when the knock-outs 78, 80 and 82 are removed. Alternatively, other pipes configured to fit in the boiler 10 in a pipe down configuration may be substituted for pipes 16, 18, and 20 once pipes 16, 18, and 20 are removed. In still other embodiments, the pipe down configuration is accomplished by removing the pipe caps 83 at the top of pipes 16. 18, and 20. Extension pipes (not shown) which may be separately provided by others may be attached to the bottom of pipes 16, 18, and 20 to extend through the holes created by removing the knock-outs 78, 80, and 82. Thus, the boiler 10 is adaptable to a floor or wall mounting and pipes 16, 18, and 20 are adaptable to an up or down configuration.

In accordance with a preferred embodiment of the present invention, a controller 84 is provided. In some of the embodiments of the invention, the controller 84 monitors a flue gas temperature, an outlet water temperature and a return water temperature. As shown in FIG. 1, a flue gas sensor 86 may be mounted in the flue pipe 43 an outlet water temperature sensor 88 may be mounted on a pipe feeding the water outlet pipe 18 and a return water temperature sensor 90 may be mounted in the heat exchanger 14 to monitor a return water temperature. These sensors may input the data to the controller 84. A pressure and temperature gauge 92 may be provided on the faceplate 94 of the controller 84 to allow users to monitor pressure and temperature within the boiler 10. A pressure and temperature sensor well 95 may be configured in the boiler 10 for receiving a sensor for providing pressure and temperature data to the pressure and temperature gage 92. An electronic display 96 and buttons 98 for manipulating the controller 84 may be provided to allow a user to manipulate the boiler 10.

The controller 84 may include electronic circuitry which may become warm as the controller 84 operates. In order to provide cooling to the controller 84 and to avoid overheating the controller 84, the controller 84 may mounted within the sealed chamber 64 and may be kept cool by the outside air flowing in the chamber 64. Alternatively, the controller 84 maybe mounted separately from the sealed chamber 64 as shown in FIG. 1. A vent 100 may be provided to permit air to circulate through the controller 84 to avoid the controller 84 from overheating.

Boilers 10 may be located in basements of other places where a boiler 10 may be subject to getting wet from leaks or spills from sources located above the boiler 10. To avoid the of electronic components being subject to water damage, a gutter channel 102 may be provided to protect the controller 84 from leaks or spills. The gutter channel 102 may be used to channel water which may be spilled on top of the boiler 10 away from the controller 84. The channel 102 may direct fluids down to the sides of the boiler 10 and away from any electronic components of the controller 84. The channel 102 may be part of a top cover or controller housing 104. Alternatively, the channel 102 may be a separate feature.

According to a preferred embodiment of the invention, the controller 84 may monitor a variety of parameters associated with the boiler 10 and the ambient conditions where the boiler 10 is located. For example, outlet temperature may be monitored by a sensor 88, the return water temperature may be monitored by a sensor 88, the flue temperature may be monitored by a sensor 86. In some embodiments, the outside air temperature and indoor ambient air temperature may be monitored by sensors (not shown). The data from those sensors may be used to predict the heating requirements for a building. For example, if the outside sensor senses that the outside temperature is warm, then the controller 84 can predict a lower boiler water temperature will be required. If the outside air temperature is cold, then the controller 84 can predict that the required boiler water output will need to be warmer in order to perform the necessary heating requirements for the building. The controller 84 may adjust the boiler 10 accordingly.

Many old or prior art boilers where controlled by either turning the boiler on when more hot water was required or off when no more hot water was required. This type of boiler control does not maximize efficiency. For example, simply turning the boiler on or off in response to calls for more or less heat may result in creating more hot water than necessary. In the preferred embodiment of the present invention, the controller 84 can modify the burner 32 to generate more heat, less heat or turn the burner 32 on or off, thus providing more options for the boiler 10 than simply on and off. The controller 84 manipulates the burner by manipulating the gas valve 22 and/or the blower 30. The more closely controlled the boiler 10, the more efficient the boiler 10. Thus, the controller 84, by monitoring a variety of conditions and closely controlling the boiler 10 to increase the burner firing rate or decrease the burner firing rate rather than simply turning the burner 32 on or off provides for a more efficient boiler 10. In addition, the controller 84 may be configured to receive two different calls for heat, one to produce domestic hot water and the other to create hot water to be provided in the heating circuit. Depending on which call for heat the controller 84 receives, the controller 84 can configure the boiler 10 to operate differently to optimize the types of hot water requirements that are required depending on the individual needs of the installation.

In some embodiments of the invention, a pressure check valve 105 is used to connect the pressure portion of the pressure/temperature display 92 to the boiler 10. For purposes of service the pressure check valve 105 isolates the boiler water in the heat exchanger 14 from the chamber 64.

In accordance with the preferred embodiment of the present invention, the controller 84 is located on the top of the boiler 10. Locating the controller 84 on top of the boiler 10 provides several advantages. For example, locating the controller 84 on the top of the boiler 10 prevents any condensate from accidentally flowing into the controller 84 and damaging the electronic parts. In addition, locating the controller 84 on top of the boiler 10 permits easy access for an operator to articulate the control features 98 of the controller 84 when the boiler 10 is mounted on the floor. At the same time, if the boiler 10 is wall mounted, mounting the controller 84 on top of the boiler 10 also makes the controller 84 accessible to an operator in order to articulate the control features 98.

In accordance with another embodiment of the present invention, a mono block heat exchanger 14 is provided. The mono block heat exchanger 14 is useful in that it is comprised primarily of one block and an access cover 44. Many prior art heat exchangers are comprised of several cast iron sections that are connected together by bolts or other fasteners. The sections must then be sealed together. Certain advantages can be achieved by using a unitized or single mono block heat exchanger. For example, the sections do not need to be sealed together, thus reducing the chance for leaks. There is an ease in manufacturing in that the sections do not need to be assembled or bolted, thus reducing cost of manufacturing.

In certain preferred embodiments of the present invention the heat exchanger 14 is made of cast aluminum. Aluminum provides several advantages over cast iron heat exchangers in that it is lighter than cast iron and thus makes the boiler 10 better suited for wall mounting. In addition, cast iron heat exchangers are extremely susceptible to corrosion. Condensate is made of primarily water but may have a low pH and may be slightly acidic. This slightly acidic property makes the condensate corrosive. Because of the susceptibility to corrosion, exhaust gases in cast iron boilers are often not cooled to a sufficient degree to cause the water vapor in the exhaust gases to condense. Limiting the amount of heat removed from the exhaust gases reduces the efficiency of a heat exchanger. In an aluminum heat exchanger, boiler gases can be cooled to a degree that the water vapor within the combustion gases will condensate, because of aluminum's resistance to corrosion. The exhaust gases need not be limited in how much they are cooled, thus aluminum heat exchangers can be used more efficiently because more heat can be harvested from the exhaust gases.

Many prior art heat exchangers incorporate a parallel flow design heat exchanger. Parallel flow is often used, even though it is a less efficient design than counter flow, because parallel flow heat exchangers are less likely to cool exhaust gases to a point to cause water vapor to condensate. As previously mentioned, cast iron heat exchangers are not well suited to deal with condensate and are thus configured to not cool exhaust gases to the point to cause water vapor to condense. Aluminum heat exchangers are not as susceptible to the corrosion caused by condensate and thus are able to incorporate a more efficient counter flow design regardless of the fact that exhaust gases will be cooled to the point where water vapor will condensate. Thus, another advantage of an aluminum heat exchanger is that it is well suited for a more efficient counter flow type design. Accordingly, the preferred embodiment of the present invention uses a counter flow heat exchanger 14.

According to a preferred embodiment of the present invention, the flue pipe 43 and the air intake pipe 66 are comprised of high grade stainless steel, for example, AL294C stainless steel. Stainless steel is used because it is a durable material and capable of withstanding the corrosive effects of flue gas.

In some embodiments of the present invention, pipes 43 and 66 are adapted to connect to 3 inch PVC, ABS or CPVC pipe where the PVC, ABS or CPVC pipe is used to duct the air intake from, and the flue gases to, the outside. Other pipes such as 4, 5, 6 inch and other size pipes may be used. The PVC, ABS or CPVC ducting may terminate outside with a termination unit as described in U.S. Pat. No. 5,062,354 the contents of which are incorporated herein by reference in their entirety.

The flue pipe 43 and the air intake 66 may be equipped with a transition section 106, which provides for the transition to the stainless steel pipe to the PVC, ABS OR CPVC ductwork (not shown). The transition section 106 may include a clamp 108 built into both the flue pipe 43 and the air intake pipe 66. The clamp 108 may be a typical screw articulated type clamp used for connecting pipes together. In addition, gaskets 110 may also be provided in the pipes 43 and 66. The gaskets 110 provide for a seal between the stainless steel pipes 43 and 66 and the PVC, ABS OR CPVC ductwork. The gasket 110 may be a silicone material, which may have the property of not vulcanizing at room temperature. The gasket 110 may be already set within the pipes 43 and 66 when the boiler 10 is shipped, thus requiring no modifications to the boiler 10 when attaching the PVC, ABS or CPVC duct work other than seating the PVC, ABS or CPVC duct work pipe into the pipes 43 and 66 and tightening the clamps 108.

Attaching the transition section 106 to the PVC, ABS or CPVC ductwork may include sliding a PVC, ABS or CPVC pipe into the transition section 106 and seating the end of the PVC, ABS or CPVC pipe against the gasket 110 or sliding it beyond the gasket 110 depending on how the gasket 110 is configured. Once the PVC, ABS OR CPVC pipe is seated the clamp 108 is tightened to secure the connection.

In some embodiments of the present invention, as shown in FIG. 7, the transition piece 106 of pipes 43 and 66 extend through the jacket or housing 62 in a substantially sealed manner. A gasket 122 is press fit around the exterior of the transition piece 106 of pipes 43 and 66 and the housing 62. The gasket 122 is rubber, but may include other materials well known for use in gaskets in the art. Other embodiments of the invention may include using gaskets made of other suitable materials.

Figure 9:
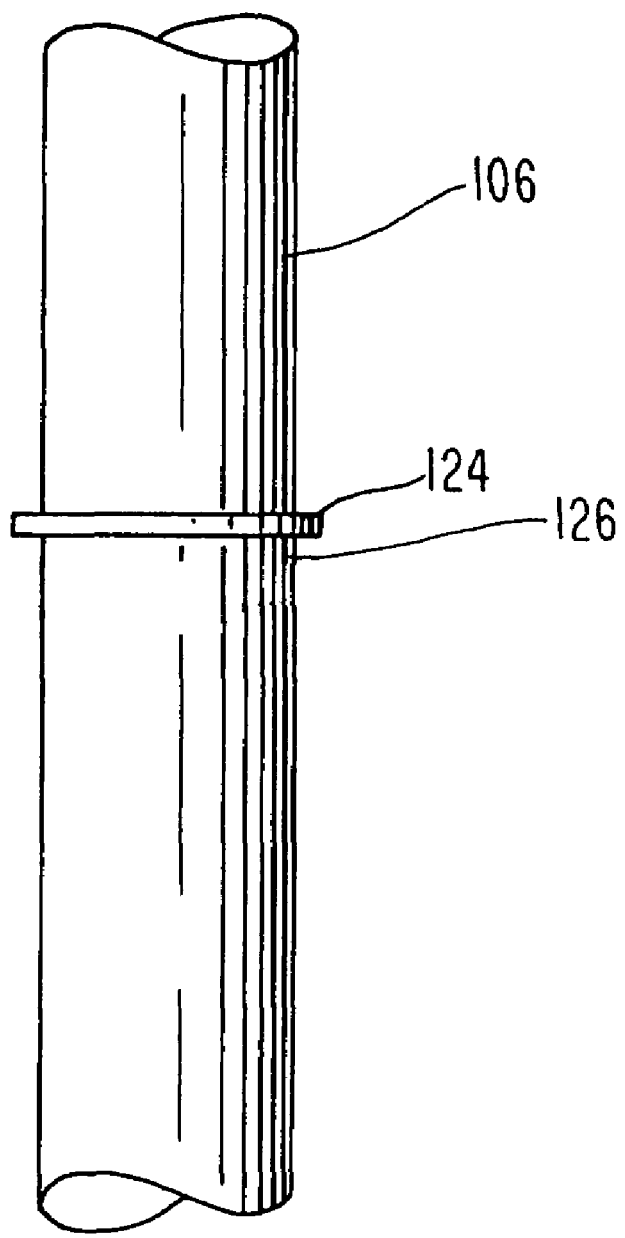
FIG. 9. is a partial side view of an exhaust pipe according to an embodiment of the invention.

As shown in FIG. 9. the transition pieces of pipes 43 and 66 have a lip 124 and a gasket receiving area 126 next to the lip 124. The gasket 122 is fit into the gasket receiving area 126. The lip 124 aids in retaining the gasket 122 in the proper receiving area 126. In some embodiments of the invention, the lip 124 may aid in creating a seal between the transition pieces 106 of pipes 43, 66 and the housing 62. Sealing the transition piece 106 of pipes 43 and 66 aids in creating the sealed chamber 64 (shown in FIG. 7). Other embodiments of the invention may include sealing the pipes 43 and 66 to the housing 62 in some other manner well known in the art.

Figure 5:
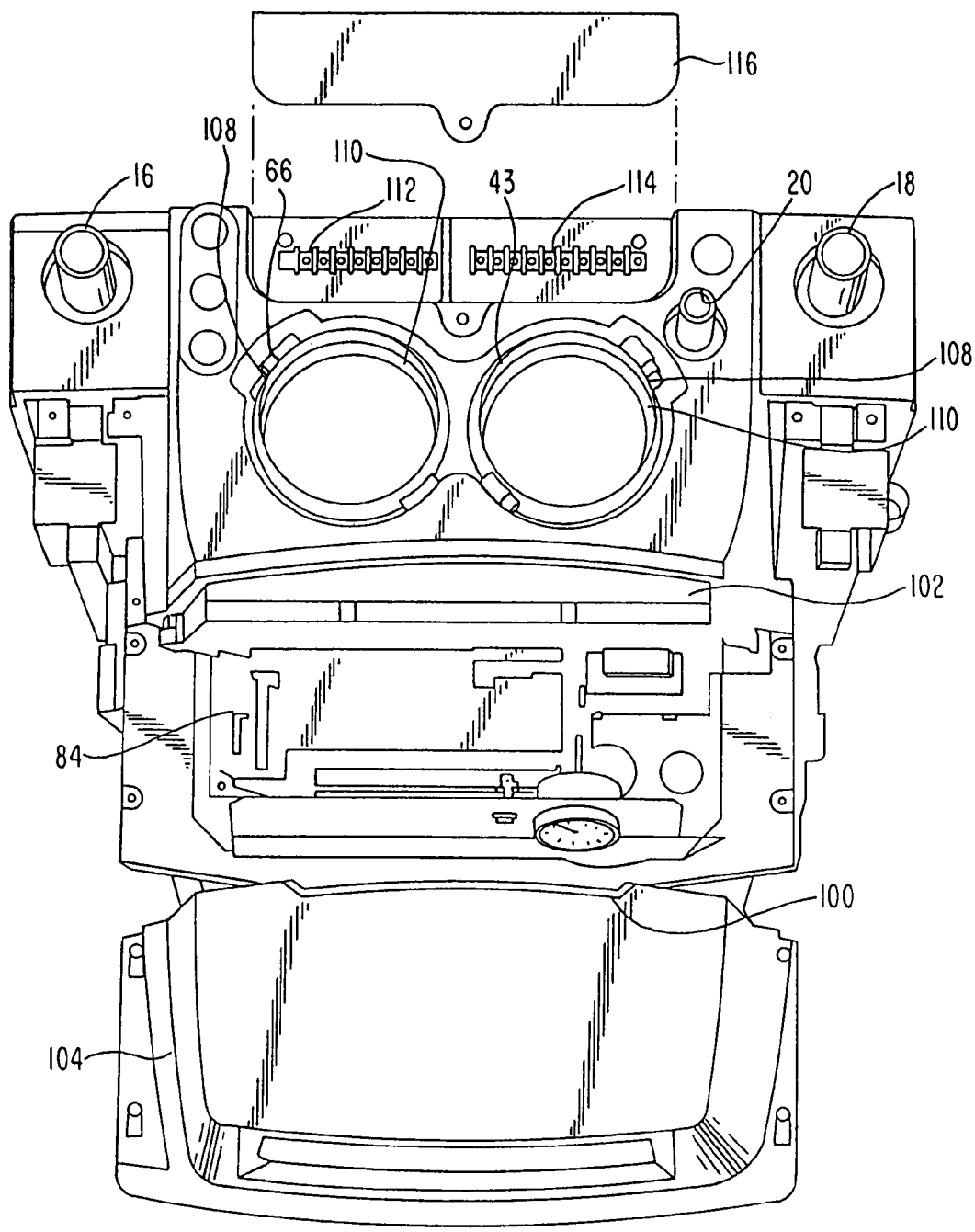
FIG. 5 is a partially exploded top view of a preferred embodiment of the present invention.

According to a preferred embodiment of the present invention, electrical connections 112 and 114 are provided on a top portion 74 of the boiler 10. As shown in FIG. 5, a separate high voltage connection 112 and separate low voltage connection 114 are provided. In some embodiments of the invention the high voltage connection 112 may be line voltage. These two connections 112 and 114 provide a single place for all wiring connections for the boiler 10. For example, when installing the boiler 10 there will be no need to access internal wiring or hunt for connections because all connections will be consolidated in these two locations 112 and 114. An electrical entrance cover plate 116 is also provided to protect the connections 112 and 114. Consolidating electrical connections provide an easy one stop place for electrical access. An electrical outlet 118 is also provided on the jacket 62 of the boiler. This electrical outlet 118 provides line voltage access which may be useful in installing or servicing the boiler 10 or for any other needs requiring a convenient line voltage access port.

According to another embodiment of the invention, handles 120 may be provided on the boiler 10. The handles 120 may be attached to the jacket or housing 62 as shown in FIG. 1. The handles 120 provide a convenient place to grab and lift the boiler 10. The handles 120 may facilitate moving, installing and servicing the boiler 10.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A transition piece comprising:
    a tube having a connecting end;
    a clamp attached to the tube near the connecting end; and
    a gasket mounted inside the tube near the connecting end,
    wherein the transition piece is configured to connect to a pipe by fitting the pipe inside the connecting end and engaging the gasket around an outside wall of the pipe in a substantially airtight manner and the clamp is configured to tighten an outside wall of the tube to create a pressfit engagement between the tube and the pipe, and
    wherein the transition piece is mounted in a combustion device and further wherein an exterior of the transition piece extends through the combustion device in a substantially air tight manner such that an interior portion of the combustion device is substantially sealed from ambient surroundings of the combustion device.

2. The transition piece of claim 1, wherein the gasket is comprised of silicone.

3. The transition piece of claim 1, wherein the gasket is a non-room temperature vulcanizing material.

4. The transition piece of claim 1, wherein the connecting end is configured to connect to a PVC, ABS or CPVC pipe having at least one of approximately a 3, 4, 5 and 6 inch diameter.

5. The transition piece of claim 1, wherein the tube is stainless steel.

6. The transition piece of claim 1, wherein the transition piece is configured to provide ducting for at least one of: combustion gases and fresh air.

7. A transition piece comprising:
    a tube having a connecting end;
    a clamp attached to the tube near the connecting end; and
    a gasket mounted inside the tube near the connecting end,
    wherein the transition piece is configured to connect to a pipe by fitting the pipe inside the connecting end and engaging the gasket around an outside wall of the pipe in a substantially airtight manner and the clamp is configured to tighten an outside wall of the tube to create a pressfit engagement between the tube and the pipe, wherein the transition piece is configured to provide ducting for at least one of: combustion gases and fresh air, and further comprising a second transition piece wherein the first and second transition pieces are mounted in a boiler and the first transition piece is configured to vent the combustion gases outside the boiler, and the second transition piece is configured to vent fresh air into the boiler.

8. A transition piece comprising:
    a tube having a connecting end;
    a clamp attached to the tube near the connecting end; and
    a gasket mounted inside the tube near the connecting end,
    wherein the transition piece is configured to connect to a pipe by fitting the pipe inside the connecting end and engaging the gasket around an outside wall of the pipe in a substantially airtight manner and the clamp is configured to tighten an outside wall of the tube to create a pressfit engagement between the tube and the pipe, wherein the transition piece is mounted in a boiler and further wherein an exterior of the transition piece extends through the boiler in a substantially air tight manner such that an interior portion of the boiler is substantially sealed from ambient surroundings of the boiler.

9. The transition piece of claim 8, further comprising a second gasket mounted between the transition piece and the boiler.

10. The transition piece of claim 9, wherein the second gasket is, at least in part, made of rubber.

11. The transition piece of claim 9, further comprising a lip located on the transition piece.

12. A transition piece comprising:
    a tube having a connecting end;
    a clamp attached to the tube near the connecting end; and
    a gasket mounted inside the tube near the connecting end, wherein the transition piece is configured to connect to a pipe by fitting the pipe inside the connecting end and engaging the gasket around an outside wall of the pipe in a substantially airtight manner and the clamp is configured to tighten an outside wall of the tube to create a pressfit engagement between the tube and the pipe, wherein the tube is part of duct work providing fluid communication with outside air and the duct work terminates with a termination unit comprising:

a termination cap mounted on said side wall on an exterior surface thereof having first and second portions for receiving ends of a vent pipe and air supply pipe, respectively, when the pipes are extended through a side wall;

a face plate on said termination cap at an exposed location spaced outwardly from said exterior surface when the termination cap is mounted on the side wall;

said face plate having a vent opening therethrough aligned with said vent pipe to vent through the face plate exhaust gases from the boiler which flow through the vent pipe;

said termination cap having a termination cap wall which extends around said first and second portions and within which the end of the air supply pipe is situated with said end of the supply pipe exposed to receive incoming air; and a plurality of air intake openings in said termination cap wall for receiving incoming air supplied to the supply pipe.

13. A transition piece comprising:
means for directing flow having a connecting end;
means for clamping attached to flow directing means near the connecting end; and
means for sealing mounted inside the flow directing means near the connecting end,
wherein the transition piece is configured to connect to a duct by fitting the duct inside the connecting end and engaging the sealing means around an outside wall of the duct in a substantially airtight manner and the clamping means is configured to tighten an outside wall of the flow directing means to create a pressfit engagement between the flow directing means and the duct, and
wherein the transition piece is mounted in a combustion device and further wherein an exterior of the transition piece extends through the combustion device in a substantially air tight manner such that an interior portion of the combustion device is substantially sealed from ambient surroundings of the combustion device.

14. The transition piece of claim 13, wherein the sealing means is comprised of silicone.

15. The transition piece of claim 13, wherein the sealing means is a non-room temperature vulcanizing material.

16. The transition piece of claim 13, wherein the connecting end is configured to connect to a PVC, ABS, or CPVC pipe having at least one of approximately a 3, 4, 5 and 6 inch diameter.

17. The transition piece of claim 13, wherein the flow directing means is stainless steel.

18. The transition piece of claim 13, wherein the transition piece is configured to provide ducting for at least one of: combustion gases and fresh air.

19. A transition piece comprising:
means for directing flow having a connecting end;
means for clamping attached to flow directing means near the connecting end; and
means for sealing mounted inside the flow directing means near the connecting end,
wherein the transition piece is configured to connect to a duct by fitting the duct inside the connecting end and engaging the sealing means around an outside wall of the duct in a substantially airtight manner and the clamping means is configured to tighten an outside wall of the flow directing means to create a pressfit engagement between the flow directing means and the duct,
wherein the transition piece is configured to provide ducting for at least one of:
combustion gases and fresh air further comprising a second transition piece wherein the first and second transition pieces are mounted in a boiler and the first transition piece is configured to vent the combustion gases outside the boiler, and the second transition piece is configured to vent fresh air into the boiler.

20. A transition piece comprising:
means for directing flow having a connecting end;
means for clamping attached to flow directing means near the connecting end; and
means for sealing mounted inside the flow directing means near the connecting end,
wherein the transition piece is configured to connect to a duct by fitting the duct inside the connecting end and engaging the sealing means around an outside wall of the duct in a substantially airtight manner and the clamping means is configured to tighten an outside wall of the flow directing means to create a pressfit engagement between the flow directing means and the duct, wherein the ducting means terminates with a termination unit comprising:

a termination cap adapted to be mounted to an exterior surface of the side wall and having a face plate and a peripheral flange extending from the face plate, said flange terminating in a free edge spaced outwardly from said exterior side wall surface when the termination cap is mounted thereon to present an air intake slot between said exterior side wall surface and said free edge of said flange;

a termination cap wall extending from said face plate and terminating adjacent said exterior surface when the termination is mounted thereon;

a sleeve extending inwardly from the face plate at a location within said termination cap wall for receiving the end of a vent pipe, said face place having a vent opening there through at a location aligned with said sleeve to vent exhaust gases from the end of the vent pipe through said vent openings;

means located beside said sleeve for receiving the end of the air supply pipe at a location within said termination cap wall and spaced inwardly from the face plate to maintain the end of the supply pipe exposed for the receipt of incoming air to be supplied to the boiler; and a plurality of intake openings in said termination cap wall for admitting air flowing past the free edge of said flange to the air supply pipe.

21. A transition piece comprising:
means for directing flow having a connecting end;
means for clamping attached to flow directing means near the connecting end; and
means for sealing mounted inside the flow directing means near the connecting end,
wherein the transition piece is configured to connect to a duct by fitting the duct inside the connecting end and engaging the sealing means around an outside wall of the duct in a substantially airtight manner and the clamping means is configured to tighten an outside wall of the flow directing means to create a pressfit engagement between the flow directing means and the duct, wherein the ducting means terminates with a termination unit comprising:

an interior plate adapted for mounting on an interior surface of a side wall and having side by side openings for receiving vent and air supply pipes;

an exterior plate adapted for mounting on an exterior surface of the side wall and having side by side openings for receiving the vent and air supply pipes;

a termination cap having a face plate and a peripheral flange on said face plate terminating in a free edge, said cap having a perforated wall extending from the face plate at a location inside of said flange and said cap being adapted for connection to said exterior plate with said flange substantially covering the exterior plate and said free edge spaced outwardly of the exterior plate to expose the perforated wall to outside air; and means within said perforated wall for receiving the ends of the vent and air supply pipes side by side with the end of the air supply pipe spaced from the face plate and exposed to receive air passing through the perforated wall, said face plate presenting a vent opening there through at a location adjacent to and aligned with the end of the vent pipe to vent to the outside exhaust gases through said vent opening and outwardly of the face plate.

22. A method of connecting a transition piece to PVC, ABS or CPVC pipe ductwork composing the steps of:

inserting a PVC ABS or CPVC pipe into a connecting end of the transition piece;

seating the PVC, ABS or CPVC pipe against a gasket provided in the transition piece; and tightening a clamp provided on the transition piece to create a pressfit engagement between the PVC, ABS or CPVC pipe and the transition piece, further comprising:

mounting the transition piece in a combustion device; and sealing an exterior portion of the transition piece to the combustion device such that an interior portion of the combustion device is substantially sealed from ambient conditions of the combustion device.

23. The method of claim 22, wherein the gasket is a non-room temperature vulcanizing material.

24. The method of claim 22, wherein the gasket is silicone.

25. The method of claim 22, further comprising flowing at least one of composition gases and fresh air through the transition piece.

26. The method of claim 22, wherein the transition piece is made of stainless steel.

27. The method of claim 22, wherein the sealing is accomplished, at least in part, by press fitting a gasket between the transition piece and the combustion device.

* * * * *